Nov. 8, 1955 W. J. BARNETT ET AL 2,723,324

SINGLE-ACTION SWITCH

Filed April 9, 1953 2 Sheets-Sheet 1

INVENTORS.
WILFORD J. BARNETT,
SIEGFRIED HANSEN,
HENRY M. SMITH,
BY Nicholas T Volsk
their ATTORNEY.

Nov. 8, 1955 W. J. BARNETT ET AL 2,723,324

SINGLE-ACTION SWITCH

Filed April 9, 1953 2 Sheets-Sheet 2

INVENTORS,
WILFORD J. BARNETT,
SIEGFRIED HANSEN,
HENRY M. SMITH,
BY Nicholas T Volsk
their ATTORNEY.

United States Patent Office 2,723,324

Patented Nov. 8, 1955

2,723,324

SINGLE-ACTION SWITCH

Wilford J. Barnett and Siegfried Hansen, Los Angeles, and Henry M. Smith, Pacific Palisades, Calif., assignors, by mesne assignments, to Hughes Aircraft Company, a corporation of Delaware Application April 9, 1953, Serial No. 347,778

8 Claims. (Cl. 200—123)

Figure 1:
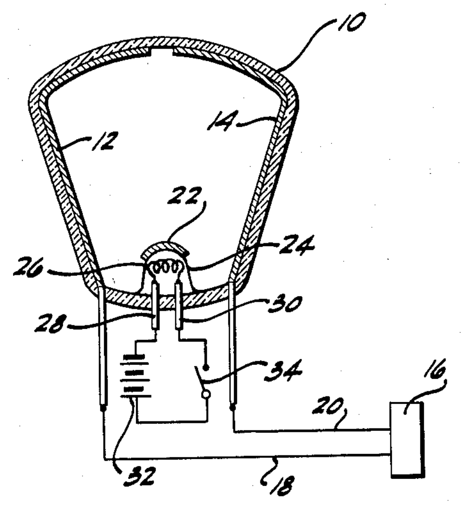

This invention relates to switching devices, and more particularly to a single-action switch suitable, for example, for establishing a desired operating condition of one or more circuits.

In many circuit applications, it is desired that specific circuits be rendered operative or inoperative from remote points. In such circuit applications, it is of the utmost importance that the switching means employed be extremely accurate and reliable to insure maximum effectiveness of control of the circuits. For such purposes, it is convenient to provide single-action switching means operable from a remote control station. For example, where it is desired to initiate operation of one or more electrical circuits, which operating conditions are not to be changed once they are established, a single-action switch is the most practical means for initiating such operating conditions.

Generally, electromechanical switching devices are employed for the purposes above referred to. For example, such a switching device is described and claimed in a copending application of F. G. Miller et al., entitled, "Single-Action Switch," Serial No. 327,518, filed December 23, 1952, now Patent No. 2,683,201, and assigned to the same assignee as is the present application. Such an electromechanical switching device as disclosed in the Miller et al. application operates in response to weakening of fuse elements to permit mechanically biased circuit contact means to operate, thereby to effect closing and/or opening of one or more electrical circuits. Although such electromechanical switching devices are highly efficient, there exists the possibility that they may fail to operate. For instance, since such switches obviously cannot be tested after assembly inasmuch as they are adapted for use only once, their effectiveness is dependent largely upon the skill with which they are assembled. Accordingly, faulty assembly of mechanically operative parts is impossible to detect and correct.

The present invention relates to a single-action switching or relay device which is easy to assemble, and in which the arrangement of component parts assures reliability of operation. In accordance with one embodiment of this invention, there is provided a single-action switching or relay device for remote control purposes and which comprises first and second pairs of conductors having spaced terminals extending into an evacuated housing. One pair of conductors is adapted for connection externally of the envelope to a control voltage source, and its terminals are connected by a heater element. The terminals of the other pair of conductors are in open-circuit condition. Evaporative material, adapted to be vaporized upon being heated, is located within the housing adjacent to the heater element. Upon sufficiently high current being passed through the heater element to heat the evaporative material, such material vaporizes rapidly and condenses into a conductive coating on the exposed surfaces throughout the interior of the housing. The initially open or unconnected terminals are spaced along a surface within the housing that is exposed to the evaporated material; therefore, such surface receives a conductive coating which provides a direct connection between the previously open terminals. Switches of this type may be produced in quantity which have uniform characteristics and which provide substantially one-hundred per cent reliability and uniformity of operation. The component parts are simple, inexpensive, and extremely easy to assemble.

In accordance with another embodiment of this invention, spaced terminals are disposed within an evacuated housing which contains evaporative material having a relatively high vapor pressure so as to vaporize readily at low temperatures, such as temperatures slightly above room temperature. Upon the evaporative material being heated through the housing to such temperatures, the material evaporates and provides a conductive connection between the terminals. A circuit may be connected to the terminals and its operation initiated when the direct connection between the terminals is established.

It is, therefore, an object of this invention to provide a single-action, evaporative-type switch in which an evacuated chamber houses a pair of spaced conductor terminals of a circuit to be controlled, and in which evaporative material is provided and adapted to be heated and vaporized for establishing a direct connection between the conductor terminals.

It is another object of this invention to provide a single-action switching or relay device in which respective pairs of conductor terminals for a control circuit and spaced conductor terminals of a circuit to be controlled extend into a common evacuated housing, and in which evaporative material adapted to be heated by the control circuit and vaporized is provided for effecting a direct connection between the spaced terminals.

It is still a further object of this invention to provide an improved single-action or switching relay device in which a pair of spaced conductor terminals are housed in an evacuated chamber that includes evaporative material, and in which such material evaporates upon being heated sufficiently to establish a direct connection between the terminals.

The novel features which are believed to be characteristic of the invention, both as to its organization and method of operation, together with further objects and advantages thereof, will be better understood from the following description considered in connection with the accompanying drawings, in which several embodiments of the invention are illustrated by way of example. The scope of the invention is pointed out in the appended claims.

Figure 8:
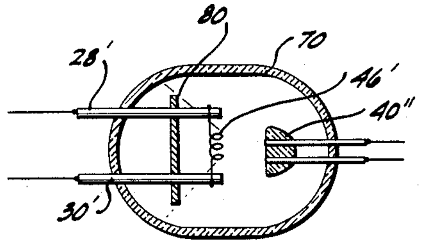
Figures 8A, 9:
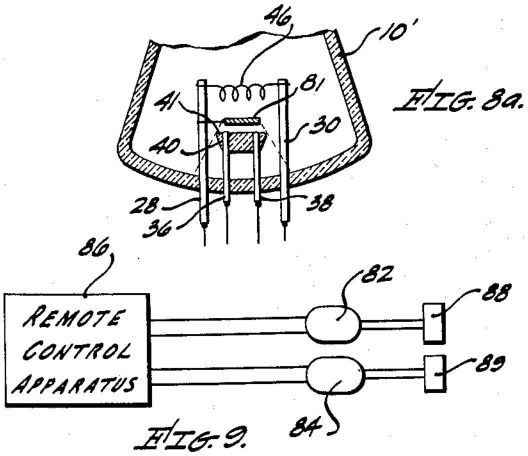
Figure 10:
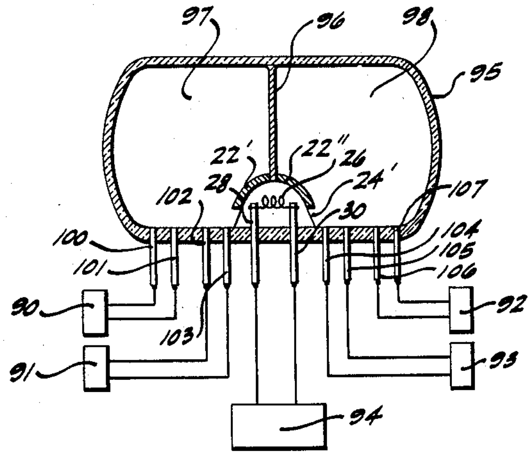
Figure 11:
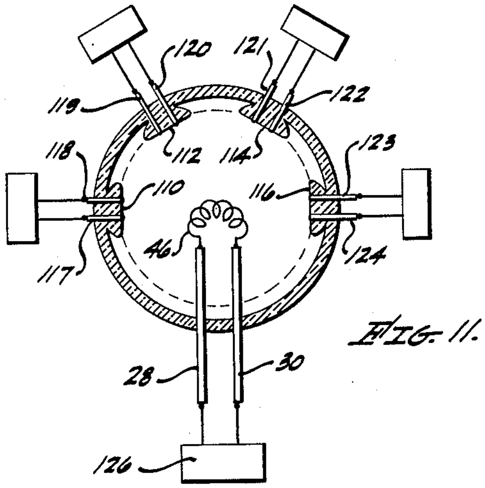
Figure 12:
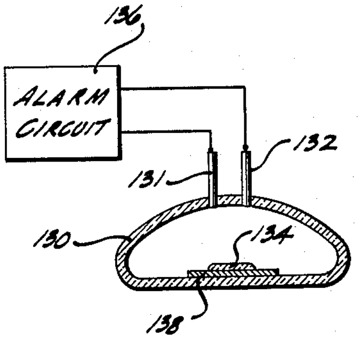

In the drawings:

Fig. 1 is a view in elevation, partly in section, of an evaporative-type, single-action switching device in accordance with this invention, in which circuit connections are shown schematically;

Figs. 2 through 8*a* are views similar to Fig. 1, showing various modifications of the arrangement of component parts of the switching device shown in Fig. 1, further in accordance with this invention;

Fig. 9 is a block diagram illustrating the use of the electronic switching device of this invention for controlling electrical circuits by remote control;

Figs. 10 and 11 are views similar to Fig. 1 illustrating exemplary uses of a single-action switching device for controlling the operating condition of a plurality of circuits, also in accordance with this invention; and Fig. 12 is a view similar to Fig. 1, showing a switching device for supporting and providing a connection between only one pair of conductors, further in accordance with this invention.

Referring to the drawings, in which like reference characters indicate like parts throughout, and more particularly to Fig. 1, these is provided an evacuated housing or chamber, which, for example, may be an evacuated glass envelope 10. Extending into the envelope 10, and disposed against or along the inner wall thereof, is a pair of conductor terminals 12, 14. Conductor terminals 12, 14 may consist of wires or separate conductive coatings on the inner wall of envelope 10. The conductor terminals 12, 14 are adapted for connection externally of the envelope 10 to an electrical circuit or network 16 shown schematically by means of respective conductors 18, 20. The ends of conductor terminals 12, 14 are spaced from each other within the envelope 10, and thus the electrical network 16 is initially in open-circuit condition.

There is provided means for effecting a direct connection between conductor terminals 12, 14 which comprises a small mass 22 of suitable evaporative material, such as silver in a suitable form to be evaporated upon being heated above a predetermined temperature. When the material 22 is thus evaporated, it effectively coats the interior of the envelope 10, thereby to provide a direct conductive connection between the ends of conductor terminals 12, 14. The evaporative mass 22 may be supported within envelope 10 by a heat-conducting member 24. A suitable heating element, such as a heater wire 26 imbedded in the heat-conducting member 24, may be connected to a pair of conductor terminals 28, 30 which extend through the envelope 10 into the evacuated chamber and through which heating current may be supplied to the heater wire 26 by a battery 32 and a switch 34 serially connected between the exteriorly extending ends of conductor terminals 28 and 30.

Upon the switch 34 being closed so that the battery 32 supplies heating current to the heater wire 26, substantially instantaneous heat transfer between the heater wire 26 and evaporative mass 22 is provided by the heat-conducting support 24. When a predetermined minimum temperature of the evaporative mass 22 is reached, rapid and progressive evaporation of the material of mass 22 is effected, and the exposed surfaces of the interior of the envelope 10 receive a conductive coating. As previously mentioned, this conductive coating provides a direct connection between the ends of conductor terminals 12, 14, and the electrical circuit 16 connected to the conductor terminals 12, 14 is thus closed.

Figure 2:
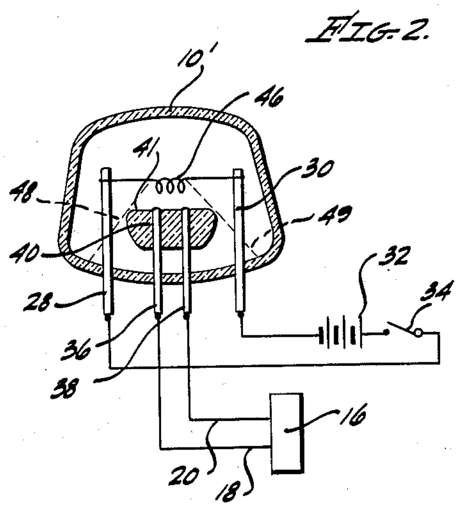

Fig. 2 illustrates a modification of the evaporative-type switch of Fig. 1, wherein a simpler arrangement of component parts permits the elimination of the heat-conducting member 24. Referring to Fig. 2, a pair of conductor terminals 36, 38 is adapted for connection externally to leads 18, 20 in the manner of conductor terminals 12, 14 of Fig. 1, and their interiorly extending ends are imbedded in a nonconducting element, such as a glass bead 40. The bead 40 preferably has a surface, indicated at 41, that is ground flat, with which the ends of conductor terminals 36, 38 are flush. Disposed on opposite sides of the bead 40 are two conductor terminals 28, 30 which are connected externally to the battery 32 and switch 34 in the manner previously described in connection with Fig. 1. A heater wire 46 is connected between the interiorly extending ends of the conductor terminals 28, 30 in the manner of heater wire 26 of Fig. 1. In the present embodiment, however, the heater wire 46 preferably is directly coated with the material to be evaporated. In this manner, the vaporization of the evaporative material is accomplished substantially instantaneously upon passage of the proper heating current through the heater wire 46, thereby eliminating the necessity for an intermediate heat-conducting element, such as the heat-conducting support 24 of Fig. 1.

The bead 40 (Fig. 2) preferably is shaped or formed so that the flat surface 41 thereof which faces the heater wire 46 is of greater dimensions than the opposite surface thereof through which conductors 36, 38 enter the bead 40. One purpose of such a shape of the bead 40 is to prevent the formation of a conductive coating between adjacent conductor terminals 28, 36 or 30, 38. A direct connection between such adjacent conductors is prevented by the preferred configuration of the bead 40 because, as is well known, particles of evaporative material, upon being vaporized in a vacuum in the manner above described, move along a substantially straight line. The bead 40 provides an obstruction which "shadows" the flashed material in the manner indicated by the dotted lines 48, 49, and prevents a conductive coating being applied to those surfaces of the bead 40 and the envelope 10 disposed within the lines 48, 49.

A further advantage in employing bead 40 having the configuration of Fig. 2 is realized in assembly of the switch. During assembly operations, heating of the envelope 10′ to seal the conductor terminals 28, 30 and 36, 38 thereto may cause objectionable oxides to form on the terminals 28, 30 at their points of contact with the inner surface of the envelope 10′. The bead 40 prevents such oxides from forming on the upper surface 41 thereof during assembly. The ground surface and the upper ends of conductor terminals 36, 38 are maintained in a clean condition during assembly so that vaporization of the evaporative material will provide a good conductive connection between the conductor terminals 36, 38.

Figure 3:
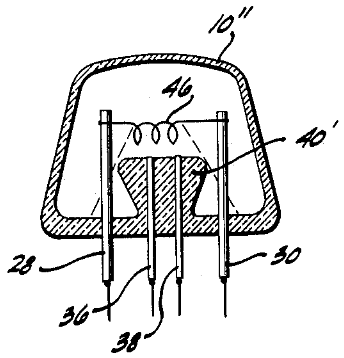

The glass bead 40 is shown in Fig. 2 as a separate element spaced from envelope 10′ and forming a component part of the evaporative switch of this invention. However, as shown in Fig. 3, the conductor terminals 36, 38 may project through a bead-like element 40′ which is integral with or forms part of the evacuated envelope 10″.

Figure 4:
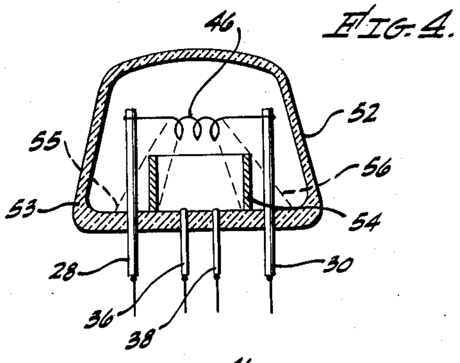
Figure 5:
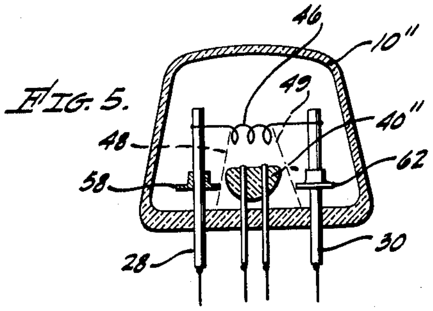
Figure 6:
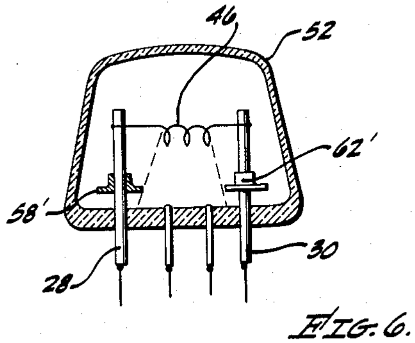

Various arrangements for providing the shadowing effect for the purpose above mentioned are illustrated in Figs. 4–6, inclusive. Referring to Fig. 4, an evacuated envelope 52 has a relatively thick base portion 53. One pair of conductor terminals 36, 38 is imbedded in the base portion 53 and extends flush with the inner surface of the base portion. Surrounding the conductor terminals 36, 38 and spaced therefrom is a short cylindrical shield 54. The heater wire 46 is supported above the shield 54 and connected between the conductor terminals 28, 30 which extend through the envelope 52 and into the evacuated chamber about the shield 54, as shown. The shield 54 is of sufficient diameter to permit material that is evaporated from the heater wire 46 to reach the inner surface of the envelope portion 53 with which the ends of conductor terminals 36, 38 are flush. The shield 54 is also of sufficient height to provide a shadowing obstruction so that the evaporative material moves in substantially straight lines beyond the periphery of the top of the shield 54, in the manner indicated by the dotted lines 55, 56.

Figs. 5 and 6 illustrate the arrangement of component parts of Figs. 2 and 4, respectively, with further provisions for providing the shadowing effects desired. In Fig. 5, angle-shaped eyelets 58, 62 are disposed about respective conductor terminals 28, 30, as shown, and provide shadowing in addition to that provided by the glass bead 40″ by preventing the evaporated material from coating the points of entrance into the envelope 10″ of conductor terminals 28, 30.

In Fig. 6, eyelets 58′, 62′, correspond, respectively, to eyelets 58, 62 of Fig. 5, and provide sufficient shadowing for the adjoining portions of the envelope 52 and conductor terminals 28, 30 so that the bead 40 of Figs. 1 and 5 and the shield 54 of Fig. 4 may be eliminated. This is possible by locating the eyelets 58′, 62′ sufficiently close to the inner surface of the envelope to prevent passage of the evaporated material therebeyond to coat the adjoining portions of the envelope 52 and conductors 28, 30. It is, of course, to be understood that one may employ both types of shielding or shadowing elements in the same switch.

Figure 7:
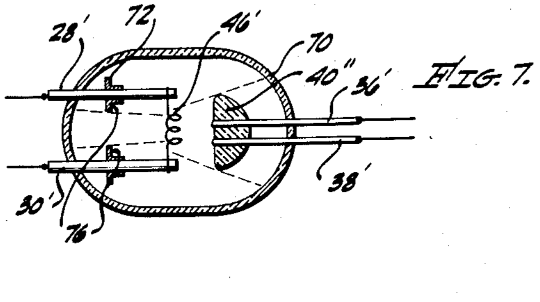

An alternative arrangement of component parts of the evaporative-type switch of this invention, which differs from the constructions previously described, is shown in Fig. 7. Referring to Fig. 7, a pair of control circuit conductor terminals 28′, 30′, and a pair of spaced conductor terminals 36′, 38′ to be connected, extend into an evacuated envelope 70 from opposite directions. A glass bead 40″, in which conductor terminals 36′, 38′ are imbedded, supports the conductor terminals 36′, 38′ in the manner of the bead 40 of Fig. 2. The spaced ends of conductor terminals 36′, 38′ are flush with the surface of bead 40″ facing a heater wire 46′ that is connected between the control circuit conductor terminals 28′, 30′. The heater wire 46′ is coated with a suitable conductive material in the manner of heater wire 46 (Fig. 2). By properly heating the material in the manner previously described, a direct connection will be provided between the spaced ends of conductor terminals 36′, 38′. Eyelets 72, 76 affixed to the respective control circuit conductor terminals 28′, 30′, in the manner of the eyelets 58, 62 of Fig. 5, provide the necessary shadowing for the purpose above mentioned.

Fig. 8 illustrates a further provision for achieving the desired shadowing effects in the double-ended tube of Fig. 7. An insulating element 80 is supported between the control circuit conductor terminals 28′ and 30′ and interposed between the heater wire 46′ and the points of entry into the envelope 70 of conductor terminals 28′, 30′. Upon the evaporative material on the heater wire 46′ being vaporized, the insulating element 80 provides an obstruction which prevents a conductive coating being applied at such points of entry.

Fig. 8*a* illustrates an arrangement similar to Fig. 2, wherein evaporative material, instead of being coated on the heater wire 46, is provided as a separate evaporative element 81 that is interposed between the heater wire 46 and the surface 41 of bead 40 to which the ends of the conductors 36, 38 extend. Evaporative element 81 may be supported by one of the conductor terminals 28, as shown. Thus arranged, the heater wire 46, upon sufficient heating current being passed therethrough, will radiate heat energy toward the evaporative element and effect its vaporization, thereby to establish a direct connection between the conductor terminals 36, 38 in the manner previously described.

As shown in Fig. 8*a*, the evaporative element 81 is a single element of evaporative material. However, it should be understood that the same purpose can be achieved by the provision of a sleeve of evaporative material placed over the heater wire 46 in the manner that an indirectly heated cathode is placed about a filament in a conventional vacuum tube.

Figs. 9–11 illustrate the use of two or more evaporative-type switches of the types previously described, along with adaptations thereof for remote control of two or more electrical circuits or networks. Referring to Fig. 9, a pair of evaporative-type switches 82, 84 have their control circuit terminals adapted for connection to remote control apparatus 86, while spaced conductor terminals thereof are connected to respective electrical circuits 88, 89. Vaporizing the evaporative materials in the switches 82, 84 in the manner previously described may be accomplished simultaneously for both switches 82, 84 to establish operation of electrical circuits 88, 89 simultaneously. However, the operation of switches 82, 84 obviously may be accomplished sequentially or successively to establish successive operation of the electrical circuits 88, 89 when desired.

In Fig. 10, an adaptation of the construction of the evaporative-type switch shown in Figs. 1 and 4 is illustrated to provide respective short-circuit connections between pairs of electrical circuits 90, 91 and 92, 93 from a remote control station 94. An evacuated envelope 95 is provided with a central partition 96, thereby to provide two separate evacuated chambers 97, 98. A heat-conducting support 24′, similar to the heat-conducting support 24 of Fig. 1, is common to both the evacuated chambers 97, 98. The portion of heat-conducting support 24′ that extends into one evacuated chamber 97 supports thereon an evaporative element 22′. Similarly, the portion of heat-conducting member 24′ that extends into the other evacuated chamber 98 supports thereon a similar evaporative element 22″. The heater wire 26 imbedded within the heat-conducting member 24′ and connected between control circuit conductor terminals 28, 30 (Fig. 1), is adapted to be supplied with heating current from the remote control point or station 94. Respective pairs of conductor terminals 100—101, 102—103, 104—105, 106—107 disposed flush with the inner surface of the envelope 95, in the manner of conductor terminals 36, 38 of Fig. 4, are provided for exterior connection to the electrical circuits 90, 91, 92, 93.

If it is desired to provide a short-circuit connection for the electrical circuits 90, 91, 92, 93 simultaneously, evaporative elements 22′ and 22″ should be comprised of substantially the same amounts of the same material so that substantially equal amounts thereof will vaporize simultaneously. On the other hand, if it is desired to provide a short-circuit connection between only two of the electrical circuits, as for example, the electrical circuits 90, 91, before the establishment of a short-circuit connection between the terminals of the other pair of electrical circuits 92, 93, evaporative element 22′ may comprise suitable material having a higher vapor pressure than the material of evaporative element 22″. Such sequential short-circuiting may thus be achieved by the use of only one heater wire 26.

Referring to Fig. 11, an adaptation of the evaporative switch described in connection with Fig. 2 employs a single heater element 46 coated with evaporative material which, upon being heated sufficiently, will provide conductive coatings upon exposed surfaces of spaced glass beads 110, 112, 114, 116. The glass beads 110, 112, 114, 116 support respective pairs of spaced conductor terminals 117—118, 119—120, 121—122, 123—124 in the same manner that bead 40 (Fig. 2) supports conductor terminals 36, 38. Furthermore, each of the glass beads 110, 112, 114, 116 is shaped in the manner of the bead 40 of Fig. 2 to prevent a direct connection being established by evaporated material between individual ones of separate pairs of conductor terminals. Thus, a direct connection is provided simultaneously for the respective pairs of conductor terminals 117—118, 119—120, 121—122, 123—124 upon the heater element 46 being supplied with sufficient current from a suitable control network 126.

The above-described embodiments of single-action, evaporative-type switches all employ heater wires for heating evaporative materials sufficiently above room temperature to effect evaporation thereof and to provide conductive connections between one or more pairs of conductor terminals. Such specific means for heating the evaporative material are not necessary. For instance, evaporative material may be heated externally to achieve the same purpose; such external heating for operating the evaporative-type switch of this invention will now be explained in connection with Fig. 12. Referring to Fig. 12, a pair of conductor terminals 131, 132 is imbedded in an evacuated envelope 130. The ends of conductor terminals 131, 132 preferably extend only to the inner wall of the envelope 130 and are flush therewith. Contained within the envelope 130 is a small mass 134 of conductive, evaporative material, and the mass 134 is spaced a short distance from the interiorly extending ends of conductor terminals 131, 132 and in relatively close proximity thereto. The material of the mass 134 preferably has a relatively high vapor pressure; for example, the material selected for mass 134 may have a sufficiently high vapor pressure so as to vaporize at a temperature of a predetermined number of degrees above the normal or room temperature of the air surrounding the envelope 130. Potassium or sodium would be typical materials suitable for this purpose. Upon the temperature of the ambient air reaching such temperature, vaporization of the material of mass 134 will be initiated. Further, upon such temperature being maintained for a relatively short period of time, continuing evaporation of the material of mass 134 establishes a conductive connection between conductor terminals 131, 132.

A construction as shown in Fig. 12 for a single-action, evaporative-type switch in accordance with this invention may be utilized for effective operation of fire detecting apparatus and would be of considerable value in detecting fires which may start in unoccupied areas of a building, such as a room of a department store. For example, the conductor terminals 131, 132 may be connected to a suitable alarm circuit 136; if a fire starts in the immediate vicinity, the alarm circuit 136 will be closed and set into operation upon the conductor terminals being connected in the manner above described.

The construction of the evaporative-type switch shown in Fig. 12 may be made somewhat more sensitive to rising temperatures of the air surrounding the envelope 130 if the evaporative mass rests or is supported upon a darkened inner surface of the envelope 130, as indicated at 138. Such a darkened surface, of course, acts as a good heat absorber, and consequently such surface will heat up much more rapidly than will the glass envelope 130. Accordingly, if the evaporative mass 134 rests on a darkened surface, the relatively rapid heating of such surface 138 will effect the evaporation of the material of mass 134 more rapidly than if the mass 134 depended for its heating solely upon the rising temperature of the glass envelope 130.

From the foregoing description, it is evident that there has been described a unique type of single-action switch, in which a pair of spaced conductors projecting into the evacuated envelope may be provided with a direct connection therebetween upon a small amount of evaporative material contained within such envelope being heated to the vicinity of its vaporization point.

What is claimed is:

1. A switching device for providing a direct connection between two spaced conductors and comprising, in combination, an evacuated housing, a quantity of conductive material contained in said housing, said material being adapted to be readily evaporated upon being heated above a predetermined minimum temperature, terminals for the conductors said terminals having their ends extending into the interior of said housing, said housing supporting the ends of said terminals in spaced relation along an inner surface of said housing, and said material being spaced from said terminals and exposed to said inner surface said material being dispersed upon being heated above said predetermined minimum temperature to adhere to said inner surface and said ends of said terminals for effecting a direct connection between the ends of said terminals.

2. A single-action switch comprising an evacuated housing, two spaced conductor terminals to be provided with a direct connection, the ends of said terminals extending to and being flush with an inner surface of said housing, and an element of conductive material, said element being positioned in said housing in exposed relation to said inner surface, said material being characterized in that it can be readily evaporated upon said element being heated above a predetermined temperature, said material being vaporized substantially instantaneously upon being heated above said predetermined temperature and caused to adhere to said inner surface and said ends of said conductor terminals, thereby to establish a direct conduction connection between said conductor terminals.

3. A single-action switch comprising an evacuated envelope, a predetermined amount of conductive material disposed within said envelope, said material being suitable to be evaporated upon being heated, said material having a predetermined minimum rate of evaporation upon being heated above a predetermined temperature, a pair of spaced conductor terminals imbedded in said envelope and extending to a surface portion within said envelope, and said material being disposed in spaced relation to and facing said surface portion, and said rate of evaporation being sufficient to cause vaporized particles of said material to be deposited upon and to adhere to said surface portion and said terminals, thereby to effect a direct conductive connection between said conductor terminals.

4. The switch defined in claim 3, in which said material is affixed to a darkened portion of the inner surface of said envelope, and in which said envelope and said material may be heated to said predetermined temperature to effect said predetermined rate of evaporation.

5. The switch defined in claim 3, in which a second pair of conductor terminals extends into said envelope, in which a heater element adjacent said material provides a direct connection between said second pair of terminals, said heater element being adapted to be supplied with current to heat said material for effecting vaporization thereof.

6. The switch defined in claim 5, in which said heater element is disposed between said material and said spaced conductor terminals.

7. The switch defined in claim 5, in which said material is provided on said heater element.

8. A single-action switch for operation by remote control to operate an electrical circuit, said switch comprising, in combination, an evacuated envelope, a first pair of conductor terminals extending into said envelope and adapted for external connection to a remote control station, a heater element connected between said conductor terminals, a second pair of conductor terminals projecting into said envelope in spaced relation and adapted for external connection to the electrical circuit, the ends of said second pair of terminals being spaced along an inner surface of said envelope and a quantity of conductive material interposed between said heater element and said inner surface, said material being adapted to be heated by current passed through said heater element from said station, said material being readily vaporized upon being heated above a predetermined minimum temperature to adhere to said inner surface and to said ends of said second pair of conductor terminals, thereby to provide a conductive coating between said second pair of conductor terminals to operate the electrical circuit.

References Cited in the file of this patent

UNITED STATES PATENTS 1,348,338 Vandergrift ............. Aug. 3, 1920

FOREIGN PATENTS 356,395 Great Britain .......... Sept. 10, 1931